United States Patent
Balasundaramohan et al.

(10) Patent No.: US 9,022,428 B2
(45) Date of Patent: May 5, 2015

(54) VEHICLE SPLASH GUARD

(75) Inventors: Barugur Balasundaramohan, Troy, MI (US); Ashley Earl, Commerce Township, MI (US); Randy Johnson, White Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 704 days.

(21) Appl. No.: 13/287,556

(22) Filed: Nov. 2, 2011

(65) Prior Publication Data
US 2013/0106089 A1 May 2, 2013

(51) Int. Cl.
*B62D 25/16* (2006.01)
*B62D 25/18* (2006.01)

(52) U.S. Cl.
CPC .................................... *B62D 25/18* (2013.01)

(58) Field of Classification Search
CPC ........... B62D 25/18; B62D 21/10; B62B 9/14
USPC ......... 280/770, 847, 848, 849, 850, 851, 852, 280/152.1, 152.2, 152.3, 160; 296/209, 198
See application file for complete search history.

(56) References Cited

U.S. PATENT DOCUMENTS

| | | | | |
|---|---|---|---|---|
| 3,495,673 A | * | 2/1970 | Yazejian | 180/89.2 |
| 4,264,083 A | * | 4/1981 | Matthew et al. | 280/851 |
| 4,268,052 A | * | 5/1981 | Sullivan | 280/848 |
| 4,447,067 A | * | 5/1984 | Yamashita | 280/848 |
| 4,524,986 A | * | 6/1985 | Ward | 280/851 |
| 4,605,238 A | * | 8/1986 | Arenhold | 280/851 |
| 4,621,824 A | * | 11/1986 | Arenhold | 280/851 |
| 4,688,814 A | * | 8/1987 | Arenhold | 280/851 |
| 4,709,938 A | * | 12/1987 | Ward et al. | 280/851 |
| 4,733,879 A | * | 3/1988 | Arenhold | 280/848 |
| 5,048,868 A | * | 9/1991 | Arenhold | 280/848 |
| 5,120,082 A | * | 6/1992 | Ito | 280/851 |
| 5,722,690 A | * | 3/1998 | Ward et al. | 280/851 |
| 6,193,278 B1 | * | 2/2001 | Ward et al. | 280/848 |
| 6,205,642 B1 | * | 3/2001 | Czirmer | 29/525.13 |

(Continued)

FOREIGN PATENT DOCUMENTS

| | | | | | |
|---|---|---|---|---|---|
| JP | 02041985 A | * | 2/1990 | | B62D 25/18 |
| JP | 02070581 A | * | 3/1990 | | B62D 25/18 |
| JP | 04283173 A | * | 10/1992 | | B62D 25/18 |

OTHER PUBLICATIONS

Nissan Sentra 2007 Sprash Guard, 2007 (6 Sheets of Images).

*Primary Examiner* — Brodie Follman
(74) *Attorney, Agent, or Firm* — Global IP Counselors, LLP

(57) ABSTRACT

A vehicle splash guard includes a base portion, a mounting structure, and a first non-fastener locating projection. The base portion is configured to extend into a wheel well defined by a vehicle body structure. The mounting structure is defined on an inner surface of the base portion and is configured to fixedly couple the vehicle splash guard to the vehicle body structure. The first non-fastener locating projection extends away from an inner surface of the base portion and is spaced apart from the mounting structure. The first non-fastener locating projection is configured to contact a laterally extending edge of the vehicle body structure that is located on an underside of the vehicle body structure to restrict movement of the base portion relative to the vehicle body structure in a longitudinal direction of the vehicle body structure when the vehicle splash guard is installed to the vehicle body structure.

16 Claims, 10 Drawing Sheets

(56) References Cited

U.S. PATENT DOCUMENTS

| | | | |
|---|---|---|---|
| 6,364,358 B1* | 4/2002 | Miller | 280/784 |
| 7,114,749 B2* | 10/2006 | Ward | 280/848 |
| 7,537,243 B1* | 5/2009 | Perry | 280/847 |
| 7,578,527 B2* | 8/2009 | Iverson et al. | 280/851 |
| 7,717,467 B2* | 5/2010 | Iverson | 280/847 |
| 7,766,356 B2* | 8/2010 | Iverson | 280/154 |
| 7,914,046 B2* | 3/2011 | Iverson | 280/848 |
| 8,118,329 B2* | 2/2012 | Braga | 280/848 |
| 8,651,528 B2* | 2/2014 | Earl et al. | 280/851 |
| 8,801,089 B2* | 8/2014 | Lessmeister | 296/209 |
| 2004/0140664 A1* | 7/2004 | Ward | 280/848 |
| 2009/0236814 A1* | 9/2009 | Iverson | 280/154 |
| 2012/0319392 A1* | 12/2012 | Earl et al. | 280/851 |
| 2013/0106089 A1* | 5/2013 | Balasundaramohan et al. | 280/851 |
| 2013/0140804 A1* | 6/2013 | Ward et al. | 280/851 |
| 2013/0161935 A1* | 6/2013 | Ward et al. | 280/851 |
| 2014/0035270 A1* | 2/2014 | Inoue | 280/851 |

* cited by examiner

VEHICLE SPLASH GUARD

BACKGROUND

1. Field of the Invention

The present invention generally relates to a vehicle splash guard. More specifically, the present invention relates to a vehicle splash guard having at least one projection that is configured to contact an inboard surface of a vehicle body structure to restrict movement of the vehicle splash guard in relation to the vehicle body structure.

2. Background Information

Vehicles are often equipped with splash guards that are positioned behind the tires to block water and other debris that is projected backward by the tires when the vehicle is travelling in a forward direction. Typically, the splash guards are removably coupled to the vehicle structure by fasteners such as screws, and extend into the wheel wells behind the tires. However, due to vibration of the vehicle, contact with objects and typical wear and tear, splash guards can become loose or misaligned from their original positions. Such issues can lead to increased warranty and repair costs, which is especially problematic when the splash guards are otherwise structurally free of defects.

In view of the above, it will be apparent to those skilled in the art from this disclosure that there exists a need for an improved vehicle splash guard. This invention addresses this need in the art as well as other needs, which will become apparent to those skilled in the art from this disclosure.

SUMMARY

Accordingly, in view of the state of the known technology, one aspect of the present invention is to provide a vehicle splash guard comprising a base portion, a mounting structure, and a first non-fastener locating projection. The base portion is configured to extend into a wheel well defined by a vehicle body structure when the vehicle splash guard is installed to the vehicle body structure. The mounting structure is defined on an inner surface of the base portion and is configured to fixedly couple the vehicle splash guard to the vehicle body structure. The first non-fastener locating projection extends away from an inner surface of the base portion and is spaced apart from the mounting structure. The first non-fastener locating projection is configured to contact a laterally extending edge of the vehicle body structure that is located on an underside of the vehicle body structure to restrict movement of the base portion relative to the vehicle body structure in a longitudinal direction of the vehicle body structure when the vehicle splash guard is installed to the vehicle body structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
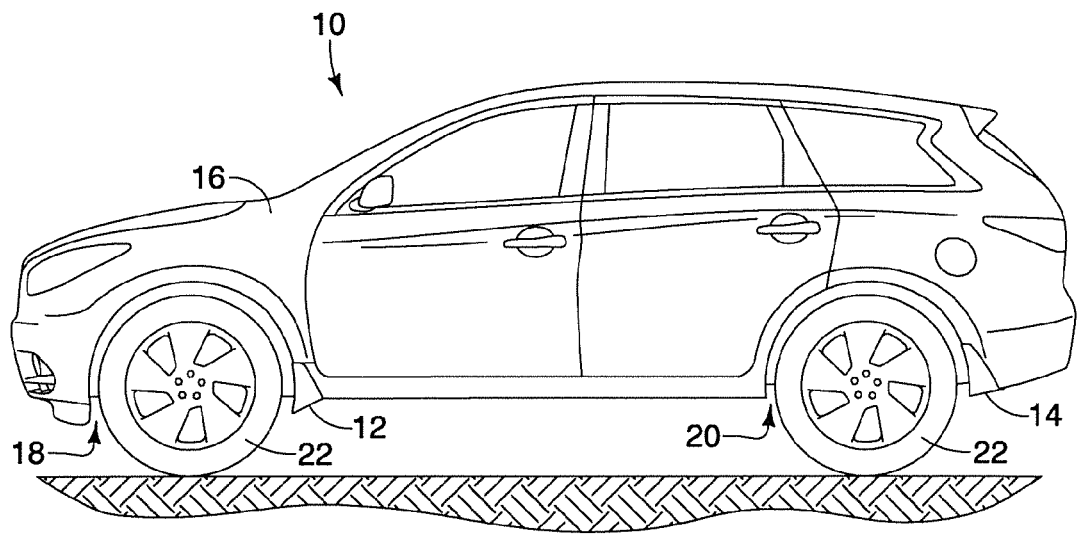
FIG. 1 is a side elevational view of a vehicle equipped with front and rear vehicle splash guards in accordance with disclosed embodiments.
Figure 2:
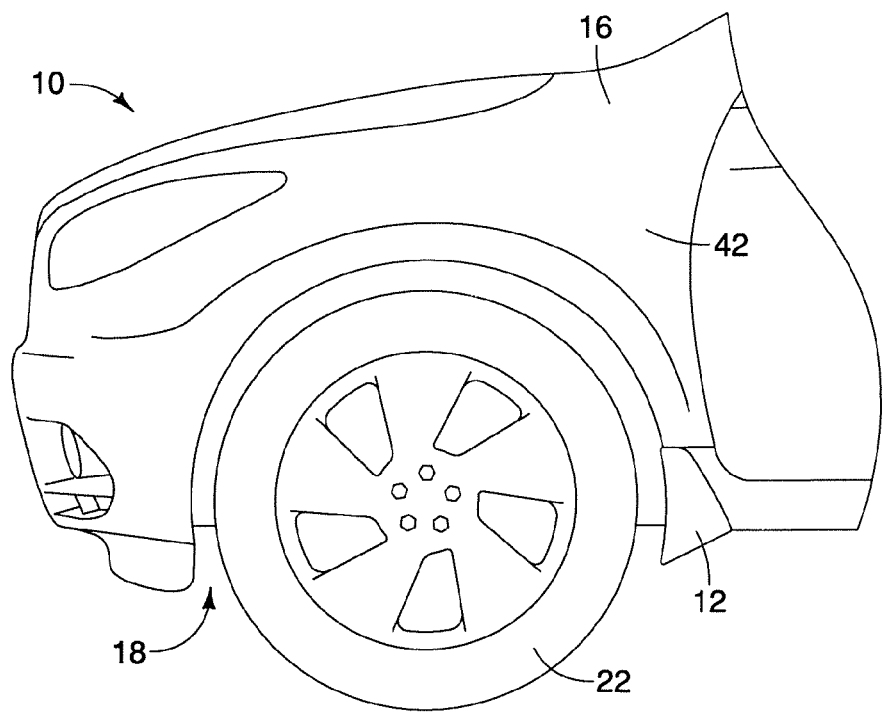
FIG. 2 is a partial side elevational view of the vehicle illustrated in FIG. 1 including a front vehicle splash guard assembly.
Figure 3:
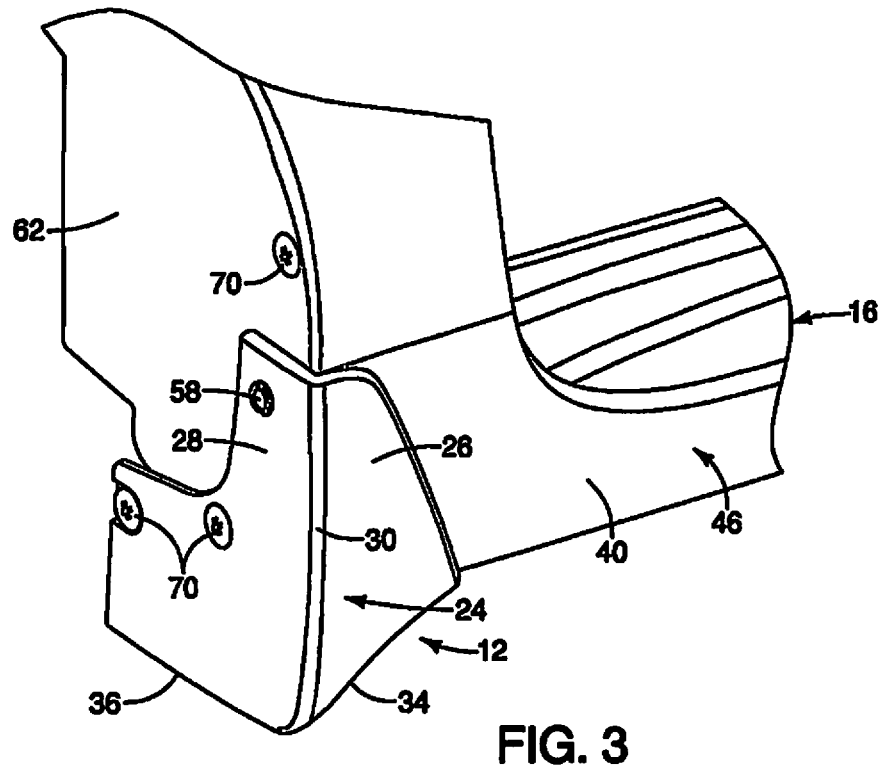
FIG. 3 is a detailed perspective view of the front vehicle splash guard installed to the vehicle illustrated in FIGS. 1 and 2.
Figure 4:
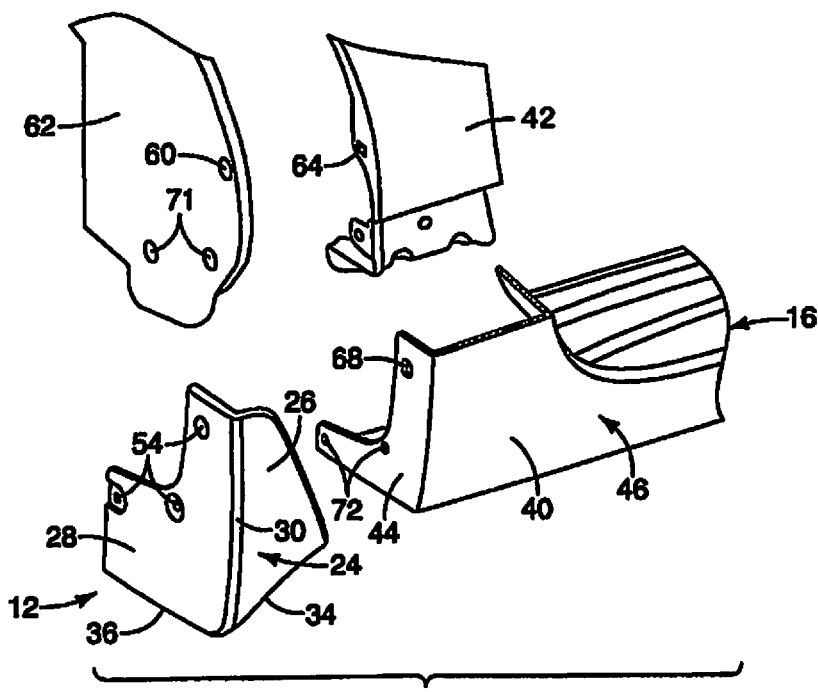
FIG. 4 is an exploded perspective view of the front vehicle splash guard assembly shown in FIG. 3.
Figure 5:
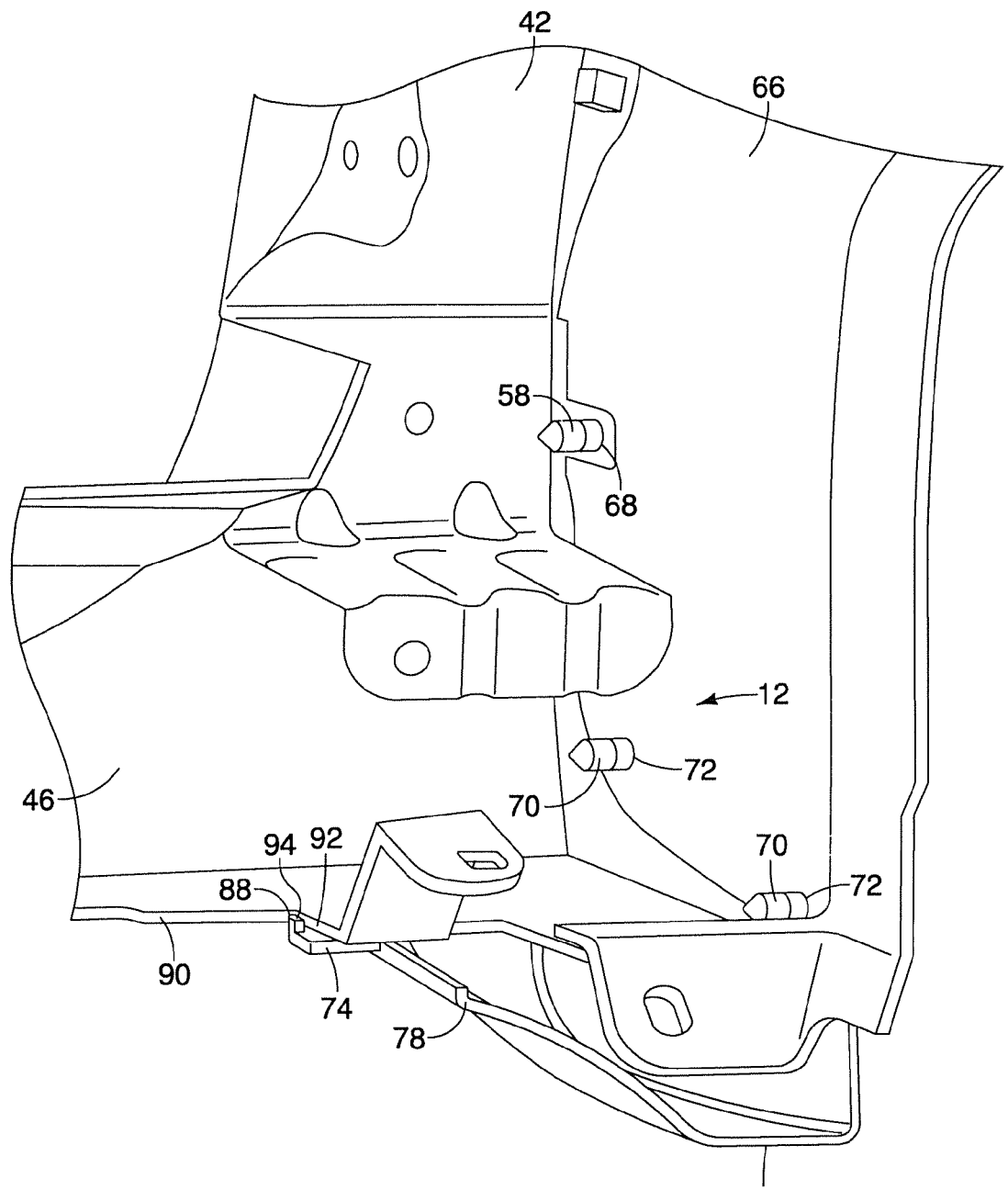
FIG. 5 is an interior perspective view of the front vehicle splash guard assembly shown in FIG. 3.
Figure 6:
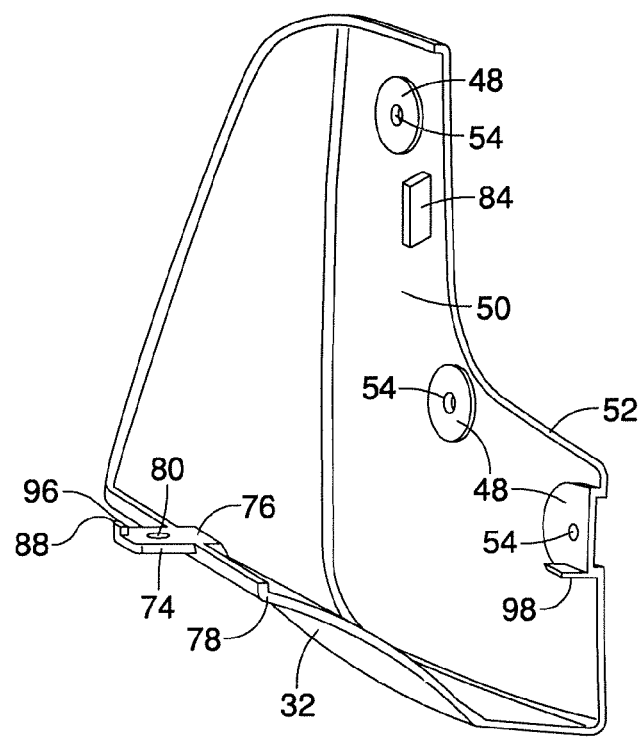
FIG. 6 is an interior perspective view of the front vehicle splash guard shown removed from the vehicle.
Figure 7:
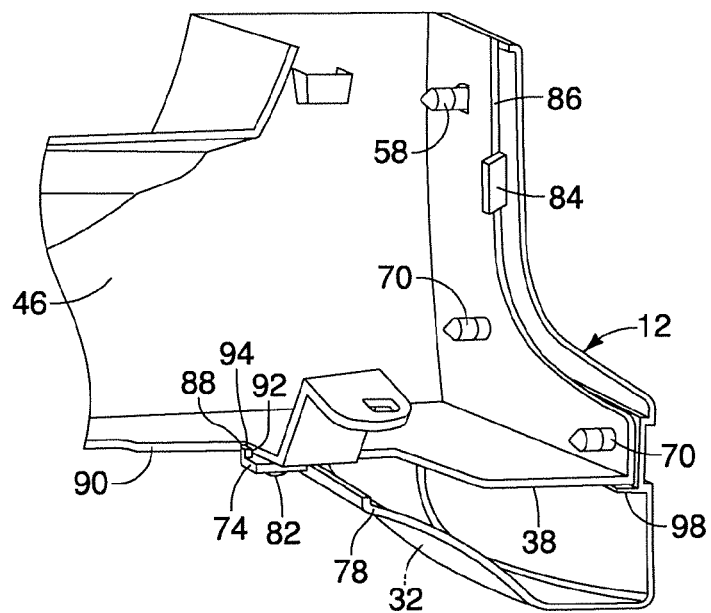
FIG. 7 is an interior perspective view of the front vehicle splash guard assembly shown in FIG. 3 with a fender protector removed.
Figure 8:
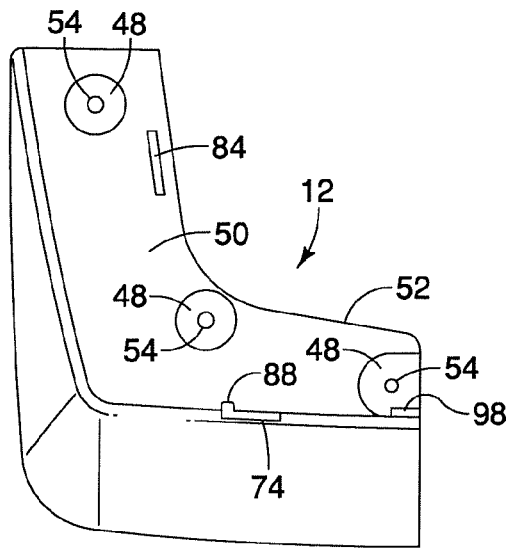
FIG. 8 is a rear elevational view of the front vehicle splash guard shown removed from the vehicle.
Figure 9:
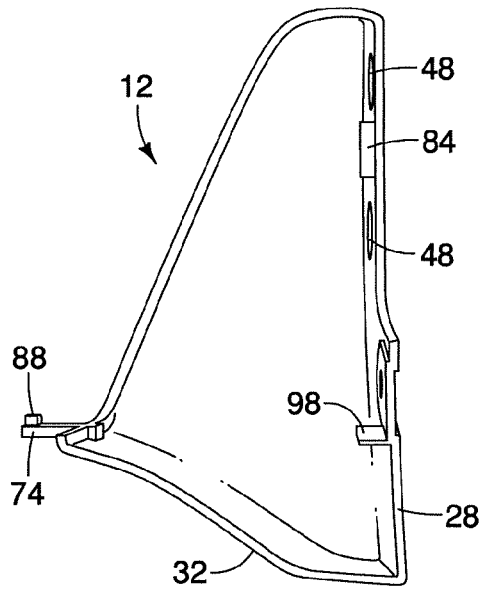
FIG. 9 is an interior elevational view of the front vehicle splash guard.
Figure 10:
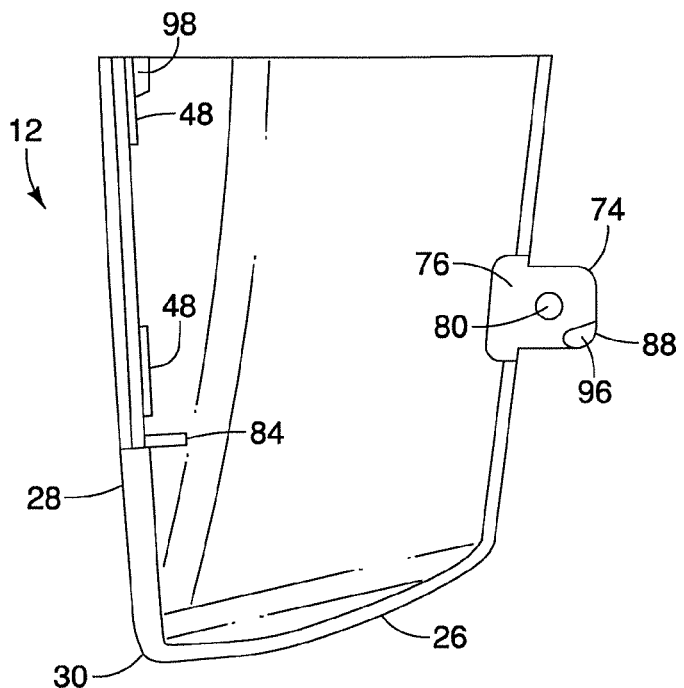
FIG. 10 is a plan view of the front vehicle splash guard.
Figure 11:
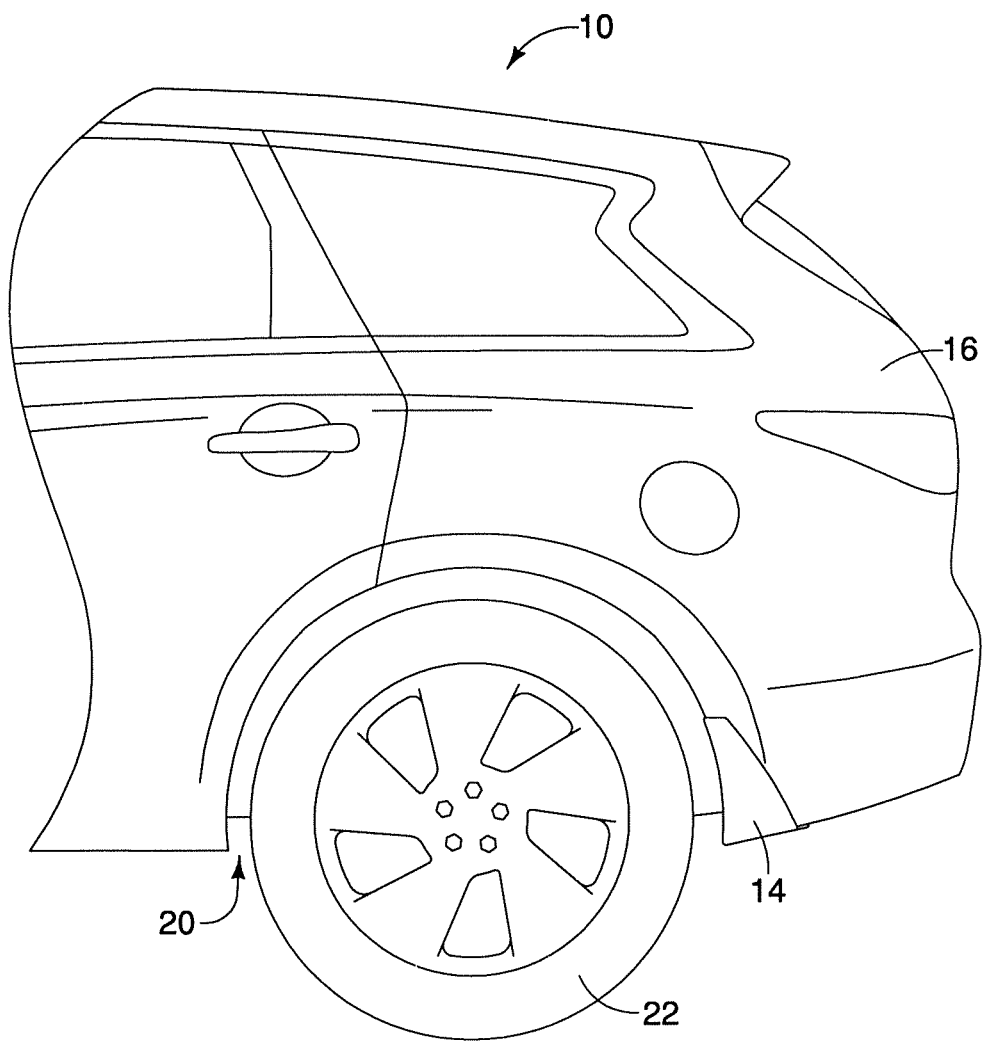
FIG. 11 is a partial side elevational view of the vehicle illustrated in FIG. 1 including a rear vehicle splash guard assembly.
Figure 12:
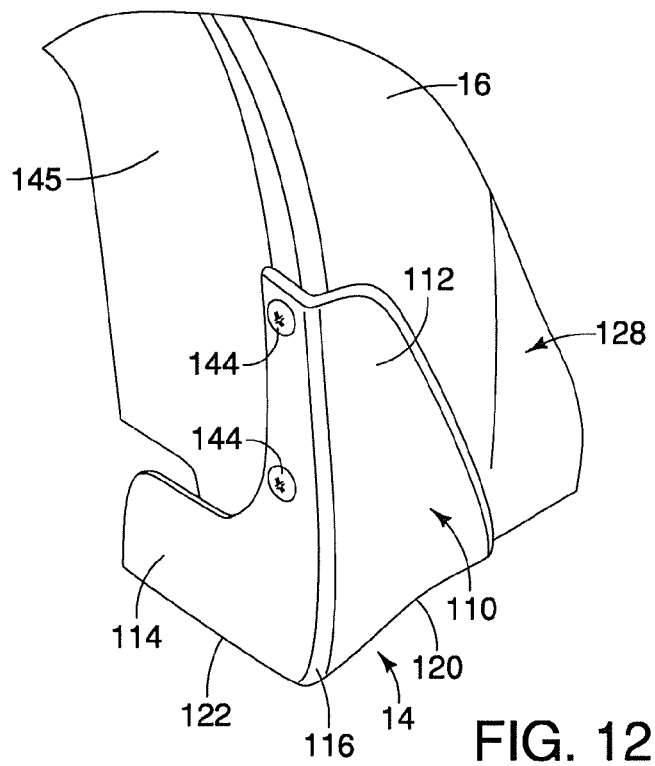
FIG. 12 is a detailed perspective view of the rear vehicle splash guard installed to the vehicle illustrated in FIGS. 1 and 11.
Figure 13:
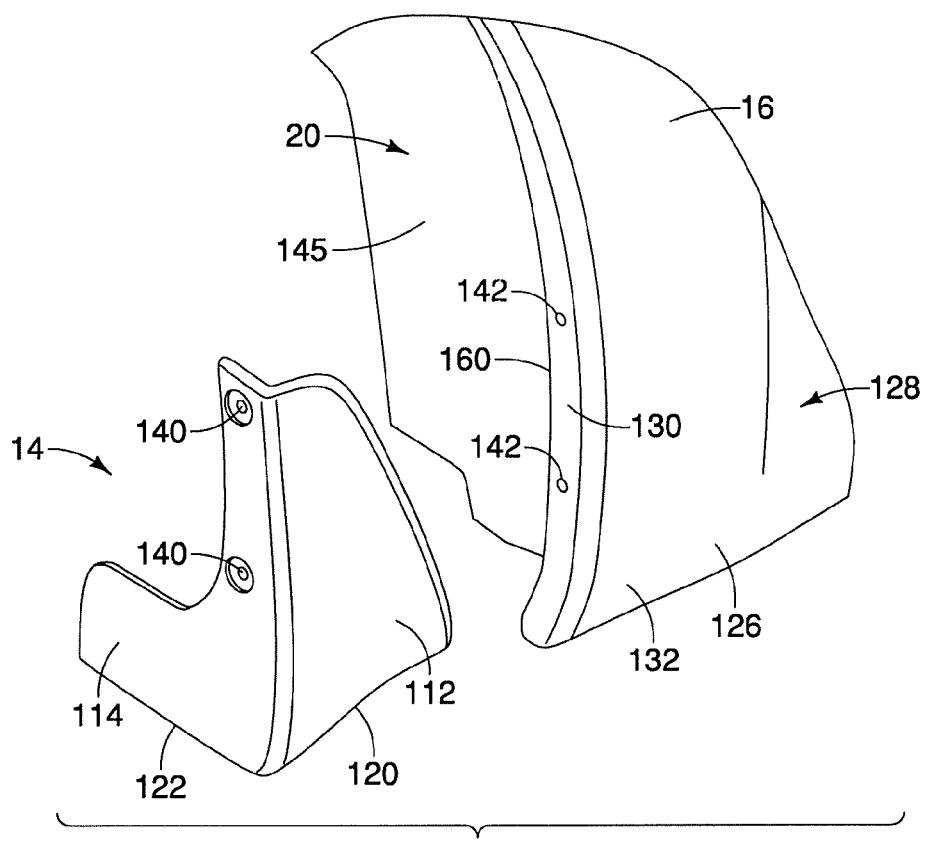
FIG. 13 is an exploded perspective view of the rear vehicle splash guard assembly shown in FIG. 3.
Figure 14:
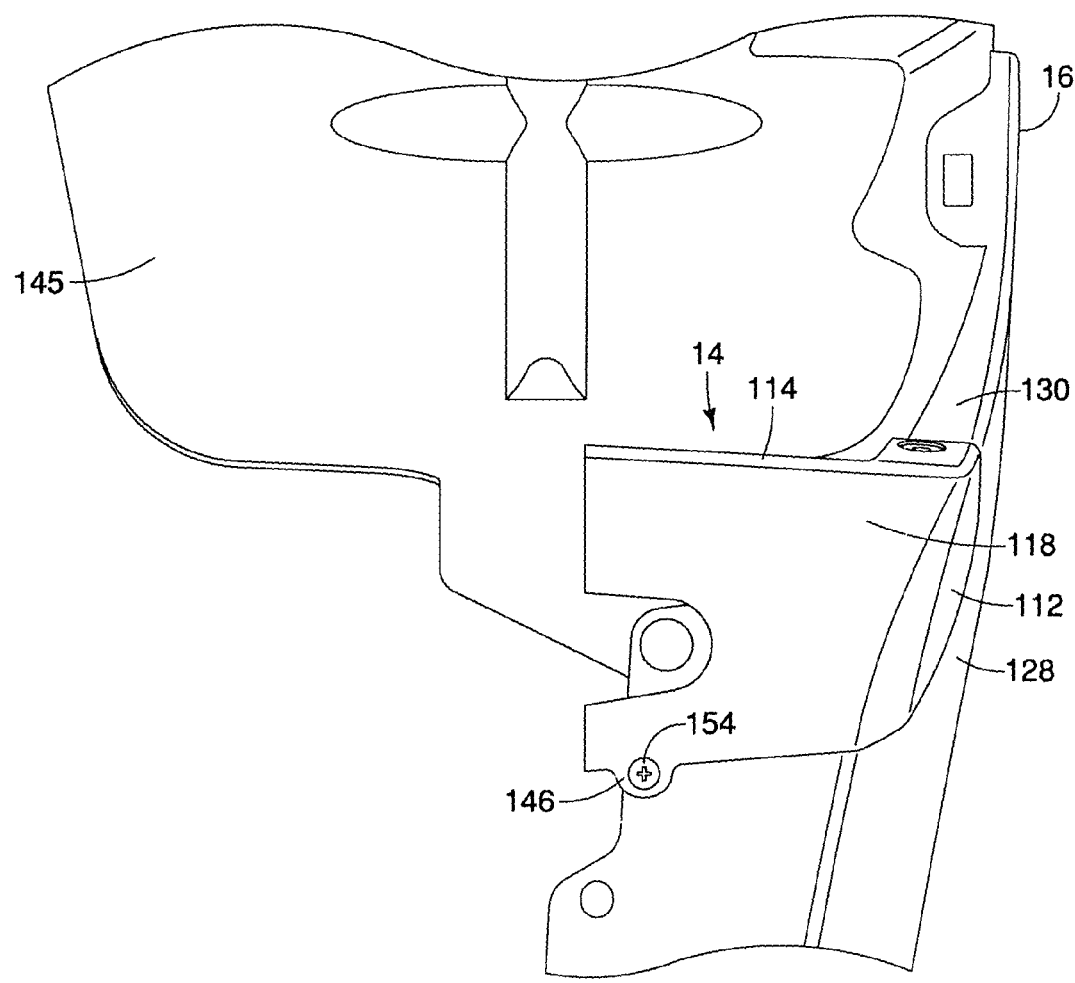
FIG. 14 is a bottom view of the rear vehicle splash guard assembly.
Figure 15:
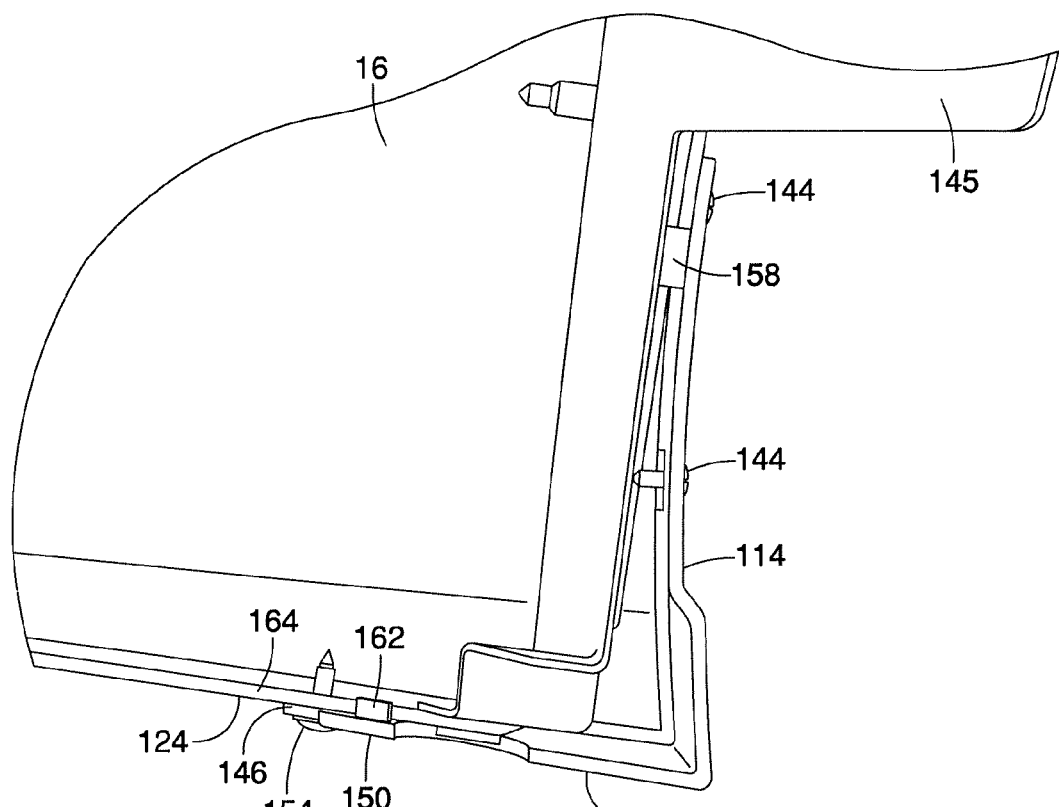
FIG. 15 is an interior elevational view of the rear vehicle splash guard assembly.
Figure 16:
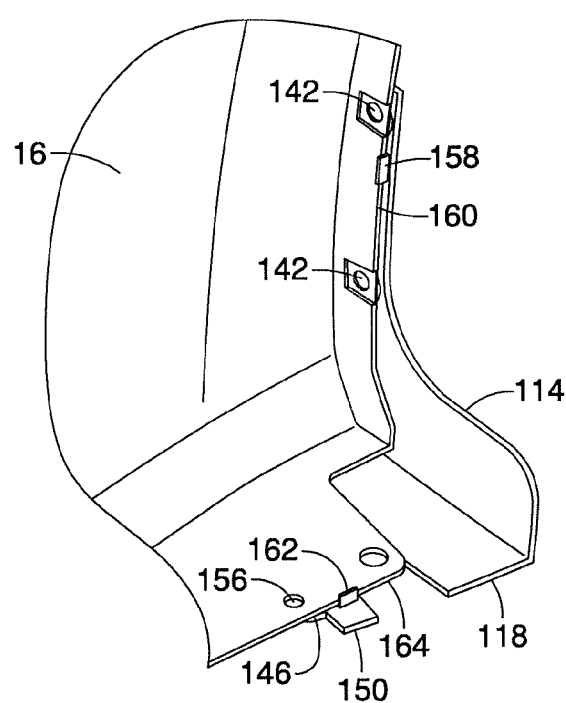
FIG. 16 is an interior perspective view of the rear vehicle splash guard assembly with a fender Fitting removed.
Figure 17:
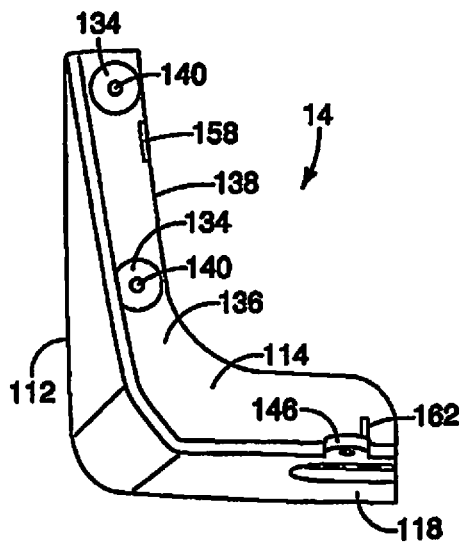
FIG. 17 is a rear elevational view of the rear vehicle splash guard shown removed from the vehicle.
Figure 18:
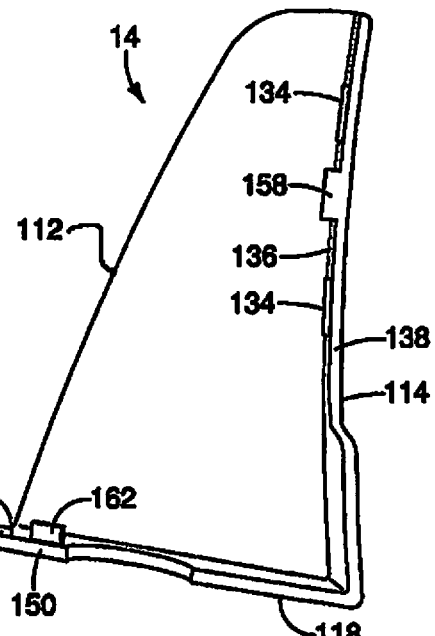
FIG. 18 is an interior elevational view of the rear vehicle splash guard.
Figure 19:
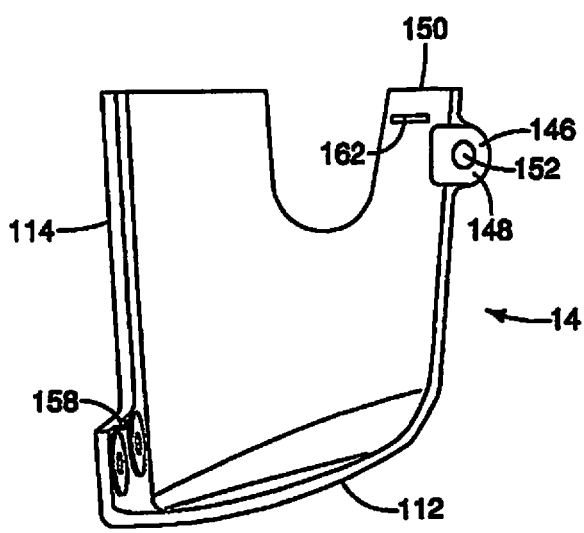
FIG. 19 is a plan view of the rear vehicle splash guard.

Referring initially to FIGS. 1 and 2, an automotive vehicle 10 is illustrated with two front vehicle splash guards 12 and two rear vehicle splash guards 14 in accordance with a disclosed embodiment. The vehicle 10 can be, for example, an automobile, a truck, an SUV, a van or any other suitable vehicle. The vehicle 10 is conventional, except for the vehicle splash guards 12 and 14 as described herein. Accordingly, the vehicle 10 and its various parts will not be discussed and/or illustrated in detail herein, except as related to the vehicle splash guards 12 and 14.

As further shown, the vehicle 10 includes a vehicle body structure 16 having front wheel wells 18 and rear wheel wells 20 on each side of the vehicle 10, with only one side (e.g., a driver's side) being shown in FIG. 1. The wheel wells 18 and 20 accommodate tires 22.

An exemplary embodiment of a front vehicle splash guard 12 installed on a first side (e.g., a driver's side) of the vehicle 10 is shown in more detail in FIGS. 3-10. As can be appreciated from the description herein, the front vehicle splash guard 12 that is installed on an opposite side (e.g., a front passenger's side) of the vehicle 10 is identical or substantially identical is construction but configured as a mirror image of the front vehicle splash guard 12 installed on the first side.

In this example, the front vehicle splash guard 12 can be made of plastic or any other suitable material that is typically used for vehicle splash guards. The front vehicle splash guard 12 includes a base portion 24. The base portion 24 includes an exterior wall 26 and a lateral wall 28 that extends perpendicularly or transverse from the exterior wall 26. The exterior wall 26 and the lateral wall 28 thus form an exterior corner 30 that extends along the base portion 24. The base portion 24 further includes a bottom member 32 that spans a lower edge 34 of the exterior wall and a lower edge 36 of the lateral wall 28. The bottom member 32 is further spaced apart from an underside 38 of the vehicle body structure 16 proximate to the lateral wall 28 when the front vehicle splash guard 12 is installed to the vehicle 10. As further shown, the exterior wall 26 is configured to contact an outboard surface 40 of the vehicle body structure 16 when the front vehicle splash guard 12 is installed to the vehicle 10. The vehicle body structure 16 includes a fender panel 42 that at least partially defines a wheel well 18 of the vehicle 10. Further, a front mounting surface 44 is defined by a rocker panel 46 (or side skirt trim), which cooperates with the fender panel 42 to further define the wheel well 18. The outboard surface 40 is thus the outboard surface of the rocker panel 46.

The lateral wall 28 is configured to extend into the wheel well 18 and contact the front mounting surface 44 of the vehicle body structure 16 when the front vehicle splash guard 12 is installed to the vehicle body structure 16 in a mounting position. As further shown, at least one mounting structure 48 is defined on an inner surface 50 of the lateral wall 28. At least one of the mounting structures 48 is spaced apart from a peripheral edge 52 of the lateral wall 28. In this example, two of the mounting structures 48 are spaced apart from the peripheral edge 52 of the lateral wall 28, and one of the mounting structures 48 is positioned proximate to the peripheral edge 52 as shown. However, the mounting structures 48 can be positioned in any suitable manner. Also in this example, each of the mounting structures 48 includes at least one mounting aperture 54 defined through the lateral wall 28 of the base portion 24.

A fastener, which can be a screw, rivet or any other suitable fastener, passes through a respective mounting aperture 54 and a corresponding aperture in the vehicle body structure 16 to fixedly couple the front vehicle splash guard 12 to the vehicle body structure 16. In this example, a fastener can be a trim clip 58 that passes through a respective mounting aperture 54 in the lateral wall 28, an opening 60 in a fender protector 62, an opening 64 in the fender panel 42, and a corresponding aperture 68 in the front mounting surface 44 of the rocker panel 46 to fixedly couple the front vehicle splash guard 12 to the vehicle body structure 16. The fastener can alternatively be a screw 70, for example, that passes through a respective mounting aperture 54 in the lateral wall 28, an opening 71 in the fender protector 62, and into a corresponding aperture 72 in the front mounting surface 44 of the rocker panel 46 to fixedly couple the front vehicle splash guard 12 to the vehicle body structure 16. Naturally, the screws 70 can be any suitable type of screw, such as a threaded screw or a self-tapping screw that creates an opening in the front mounting surface 44 during installation. Accordingly, each mounting structure 48 of the front vehicle splash guard 12 is fixedly coupled to the front mounting surface 44 of the rocker panel 46 to fixedly couple the front vehicle splash guard 12 to the vehicle body structure 16.

Also, the front vehicle splash guard 12 can further include a least one additional mounting structure 74 defined on an upper surface 76 of the bottom member 32. In this example, the additional mounting structure 74 is spaced apart from a peripheral edge 78 of the bottom member 32. The additional mounting structure 74 is configured to fixedly couple the front vehicle splash guard 12 to the vehicle body structure 16. For example, the additional mounting structure 74 can include a mounting aperture 80 that is configured to receive a fastener 82, such as a screw, a rivet, a self-tapping screw or any other suitable fastener. The fastener 82 passes through mounting aperture 80 and into a corresponding aperture (not shown) in the rocker panel 46 to fixedly secure the front vehicle splash guard 12 to the vehicle body structure 16.

The front vehicle splash guard 12 further includes at least one locating projection that extends away from an inner surface of the base portion 24. At least one of the locating projections can at least partially extend along a peripheral edge (e.g., peripheral edge 52) of the base portion 24. Also, at least one of the locating projections can be spaced from the peripheral edge of the base portion 24. More particularly, the front vehicle splash guard 12 includes a plurality of locating projections that are spaced apart from each other and extend away from different portions of an inner surface of the base portion 24 in different directions. The projections are configured to contact different portions of an inboard surface of the rocker panel 46 to restrict movement of the base portion in relation to the rocker panel 46 when the front vehicle splash guard 12 is installed to the vehicle body structure 16.

For example, a locating projection 84 extends away from the inner surface 50 of the lateral wall 28 and vertically along or proximate to an inboard edge (peripheral edge 52) of the lateral wall 28. The locating projection 84 thus contacts the inboard edge 86 of the rocker panel 46 to restrict movement of the exterior wall 26 in relation to (e.g., away from) the rocker panel 46 when the front vehicle splash guard 12 is installed to the vehicle body structure 16. In other words, the contact between the locating projection 84 and the inboard edge 86 of the rocker panel 46 restricts movement of the front vehicle splash guard 12 from the mounting position when the front vehicle splash guard 12 is installed to the vehicle body structure 16.

In addition, the front vehicle splash guard 12 can include a locating projection 88 that extends away from an upper surface (e.g., upper surface 76) of the bottom member 32. Thus the locating projection 88 can be considered to extend away from an inner surface of the base portion 24. The locating projection 88 is configured to contact an inboard edge 90 of the rocker panel 46 that extends in a longitudinal direction of the vehicle body structure 16. As shown, the inboard edge 90 is located on an underside of the rocker panel 46 and is spaced apart from the exterior wall 26 of the base portion 24 to restrict movement of the exterior wall 26 in relation to (e.g., away from) the rocker panel 46 when the front vehicle splash guard 12 is installed to the vehicle body structure 16.

As further shown, a laterally extending edge 92 of the rocker panel 46 cooperates with the inboard edge 90 of the rocker panel 46 to define a corner 94. Thus, the locating projection 88 can be further configured to contact and nest in the corner 94 to restrict both movement of the lateral wall 28 in relation to (e.g., away from) the rocker panel 46 and movement of the exterior wall 26 in relation to (e.g., away from) the rocker panel 46 when the front vehicle splash guard 12 is installed to the vehicle body structure 16. More particularly, a vertically oriented surface 96 of the locating projection 84 can include an arcuate shape that conforms to a radial contour of the corner 90.

Also, the front vehicle splash guard 12 can include a locating projection 98 that extends away from the inner surface 50 of the lateral wall 28. The locating projection 98 can be spaced apart from the bottom member 32. The locating projection 98 is thus configured to contact an underside (e.g., underside 38) of the rocker panel 46 along a free standing inboard edge 100 of the rocker panel 46 to restrict movement of the exterior wall 26 in relation to (e.g., away from) the rocker panel 46 when the front vehicle splash guard 12 is installed to the vehicle body structure 16. Therefore, the contact between the locating projection 98 and the underside 38 of the rocker panel 46 restricts movement of the front vehicle splash guard 12 from the mounting position when the front vehicle splash guard 12 is installed to the vehicle body structure 16. For example, locating projection 98 can restrict movement of the exterior wall 26 away from the outboard surface 40 of the rocker panel 46 otherwise caused by rotation of the lateral wall 28 about one or more of the fasteners 58 and/or 70.

Further details of a rear vehicle splash guard 14 will now be described with reference to FIGS. 11-19. In this example, the rear vehicle splash guard 14 can be made of plastic or any other suitable material that is typically used for vehicle splash guards. The rear vehicle splash guard 14 includes a base portion 110. The base portion 110 includes an exterior wall 112 and a lateral wall 114 that extends perpendicularly or transverse from the exterior wall 112. The exterior wall 112 and the lateral wall 114 thus form an exterior corner 116 that extends along the base portion 110. The base portion 110 further includes a bottom member 118 that spans a lower edge 120 of the exterior wall 112 and a lower edge 122 of the lateral wall 114. A portion of the bottom member 118 can contact an underside 124 of the vehicle body structure 16 when the rear vehicle splash guard 14 is installed to the vehicle body structure 16, or the bottom member 118 can be configured to be spaced apart from the underside 124 of the vehicle body structure 16. As further shown, the exterior wall 112 is configured to contact an outboard surface 126 of the vehicle body structure 16 when the rear vehicle splash guard 14 is installed to the vehicle 10. The vehicle body structure 16 includes a bumper fascia 128 that defines a rear mounting surface 130 and at least partially defines wheel well 20 of the vehicle 10. Thus, the outboard surface 126 is the outboard surface of the bumper fascia 132.

The lateral wall 114 is configured to extend into the wheel well 20 defined by the vehicle body structure 16 and contact the rear mounting surface 130 of the vehicle body structure 16 when the rear vehicle splash guard 14 is installed to the vehicle body structure 16 in a mounting position. As further shown, at least one mounting structure 134 is defined on an inner surface 136 of the lateral wall 114. At least one of the mounting structures 134 is spaced apart from a peripheral edge 138 of the lateral wall 114. In this example, two of the mounting structures 134 are spaced apart from the peripheral edge 138 of the lateral wall 114. Also in this example, each of the mounting structures 134 includes at least one mounting aperture 140 defined through the lateral wall 114 of the base portion 110.

A fastener, which can be a screw, rivet or any other suitable fastener, passes through a respective mounting aperture 140 and a corresponding aperture 142 in the rear mounting surface 130 of the bumper fascia 128 to fixedly couple the rear vehicle splash guard 14 to the vehicle body structure 16. In this example, a fastener can be a screw 144, for example, that passes through a respective mounting aperture 140 and into a corresponding aperture 142 in the rear mounting surface 130 of the bumper fascia 128 to fixedly couple the rear vehicle splash guard 14 to the vehicle body structure 16. The fasteners 144 can also optionally pass into corresponding apertures (not shown) in a fender fitting 145 (or wheel well trim) to further secure the rear vehicle splash guard 14 to the vehicle body structure 16. Naturally, the screws 144 can be any suitable type of screw, such as a threaded screw or a self-tapping screw that creates an opening in the rear mounting surface 130 during installation. Accordingly, each mounting structure 134 of the rear vehicle splash guard 14 is fixedly coupled to the rear mounting surface 130 of the bumper fascia 128 to fixedly couple the rear vehicle splash guard 14 to the vehicle body structure 16.

Also, the rear vehicle splash guard 14 can further include a least one additional mounting structure 146 defined on an upper surface 148 of the bottom member 118. In this example, the additional mounting structure 146 is spaced apart from a peripheral edge 150 of the bottom member 118. The additional mounting structure 146 is configured to fixedly couple the rear vehicle splash guard 14 to the vehicle body structure 16. For example, the additional mounting structure 146 can include a mounting aperture 152 that is configured to receive a fastener 154, such as a screw, a rivet, a self-tapping screw or any other suitable fastener. The fastener 154 passes through mounting aperture 152 and into a corresponding aperture 156 in the bumper fascia 128 to fixedly secure the rear vehicle splash guard 14 to the vehicle body structure 16.

In addition, the rear vehicle splash guard 14 includes at least one locating projection that extends away from an inner surface of the base portion 110. At least one of the locating projections can at least partially extend along a peripheral edge of the base portion 110. Also, at least one of the locating projections can be spaced from the peripheral edge of the base portion 110.

More particularly, the rear vehicle splash guard 14 includes a plurality of locating projections that are spaced apart from each other and extend away from different portions of an inner surface of the base portion 110 in different directions. The projections are configured to contact different portions of an inboard surface of the bumper fascia 128 to restrict movement of the base portion 110 in relation to the bumper fascia 128 when the vehicle splash guard is installed to the vehicle body structure 16.

For example, the rear vehicle splash guard 14 includes a locating projection 158 that extends from the inner surface 136 of the lateral wall 114 and at least partially extends vertically along or proximate to the peripheral edge 138 of the lateral wall 114. The locating projection 158 is configured to contact an inboard surface of the bumper fascia 128 to restrict movement of the exterior wall 112 away from the bumper fascia 128 when the rear vehicle splash guard 14 is installed to the vehicle body structure 16. That is, the locating projection 158 is configured to contact a free standing inboard edge 160 (inboard surface) of the bumper fascia 128 while being free from contact with respective peripheries of mounting apertures 140 and corresponding apertures 142 in the rear mounting surface 130 of the bumper fascia 128. Thus, the contact between the locating projection 158 and the inboard edge 160 of the bumper fascia 128 restricts movement of the rear vehicle splash guard 12 from the mounting position when the rear vehicle splash guard 12 is installed to the vehicle body structure 16.

In addition, the rear vehicle splash guard 14 can include a locating projection 162 that extends away from an upper surface (e.g., upper surface 148) of the bottom member 118. In this configuration, the locating projection 162 is configured to contact a laterally extending edge 164 of the bumper fascia 128 that is located on an underside of the bumper fascia 128 and that is spaced apart from the lateral wall 114 of the base portion 110. Therefore, the locating projection 162 restricts movement of the lateral wall 114 in relation to (e.g., away from) the bumper fascia 128 when the rear vehicle splash guard 14 is installed to the vehicle body structure 16. That is, the contact between the locating projection 162 and the laterally extending edge 164 of the bumper fascia 128 restricts movement of the rear vehicle splash guard 14 from the mounting position when the rear vehicle splash guard 14 is installed to the vehicle body structure 16.

It should also be noted that the front and rear vehicle splash guards 12 and 14 can have additional location projections at other positions on the front and rear vehicle splash guards 12 and 14 to further restrict movement of the front and rear vehicle splash guards 12 and 14 in relation to the vehicle body structure 16. In addition, any of the locating projections discussed above could be integrally molded (or unitarily formed) with the base portions 24 and 110 of the front and rear splash guards 12 and 14 or separately attached by any conventional means. Any of the locating projections could also be positioned to engage a corresponding cavity or opening in the mounting surfaces 44 and 130 of the vehicle body structure 16 when the front and rear vehicle splash guards 12 and 14 are installed on the vehicle 10.

Accordingly, as can be appreciated from the above, the configurations of the front and rear vehicle splash guards 12 and 14 provide increased fit and finish consistency on the vehicle 10, which results in higher perceived vehicle quality. Also, the locating projection arrangements enable the front and rear vehicle splash guards 12 and 14 to more easily and reliably be attached to the vehicle 10, thus reducing installation time and installation cost. Furthermore, since the front and rear vehicle splash guards 12 and 14 are less likely to become loose or shifted, warranty claims can be reduced, thus resulting in potential cost savings.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle splash guard comprising:
    a base portion configured to extend into a wheel well defined by a vehicle body structure when the vehicle splash guard is installed to the vehicle body structure, the base portion including an exterior wall and a lateral wall extending perpendicularly from the exterior wall, with the exterior wall being configured to contact an outboard surface of the vehicle body structure and the lateral wall being configured to extend into the wheel well when the vehicle splash guard is installed to the vehicle body structure, the base portion further including a bottom member that spans lower edges of the exterior wall and the lateral wall, and the vehicle body structure defining an inboard edge that extends in a longitudinal direction of the vehicle body structure, that is located on the underside of the vehicle body structure, and that is spaced apart from the exterior wall of the base portion such that the laterally extending edge of the vehicle body structure cooperates with the inboard edge of the vehicle body structure to define a corner;
    a mounting structure defined on an inner surface of the lateral wall of the base portion and configured to fixedly couple the vehicle splash guard to the vehicle body structure; and
    a first non-fastener locating projection extending away from an inner surface of the base portion and being spaced apart from the mounting structure, the first non-fastener locating projection being configured to contact a laterally extending edge of the vehicle body structure that is located on an underside of the vehicle body structure to restrict movement of the base portion relative to the vehicle body structure in a longitudinal direction of the vehicle body structure when the vehicle splash guard is installed to the vehicle body structure, the first non-fastener locating projection extending away from an upper surface of the bottom member, with the laterally extending edge of the vehicle body structure being spaced apart from the lateral wall of the base portion such that the first non-fastener locating projection restricts movement of the lateral wall away from the vehicle body structure when the vehicle splash guard is installed to the vehicle body structure, and the first non-fastener locating projection being further configured to contact the corner to restrict both movement of the lateral wall away from the vehicle body structure and movement of the exterior wall away from the vehicle body structure when the vehicle splash guard is installed to the vehicle body structure.

2. The vehicle splash guard according to claim 1, wherein a vertically oriented surface of the first non-fastener locating projection includes an arcuate shape that conforms to a radial contour of the corner.

3. A vehicle splash guard comprising:
a base portion configured to extend into a wheel well defined by a vehicle body structure when the vehicle splash guard is installed to the vehicle body structure;
a mounting structure defined on an inner surface of the base portion and configured to fixedly couple the vehicle splash guard to the vehicle body structure; and
at least one non-fastener locating projection extending away from an inner surface of the base portion and being spaced apart from the mounting structure, the at least one non-fastener locating projection being configured to contact both a laterally extending edge of the vehicle body structure and a free standing inboard edge of the vehicle body structure such that the at least one non-fastener locating projection restricts movement of the base portion relative to the vehicle body structure both in a lateral direction and a longitudinal direction of the vehicle body structure when the vehicle splash guard is installed to the vehicle body structure.

4. The vehicle splash guard according to claim 3, wherein the base portion includes an exterior wall and a lateral wall extending perpendicularly from the exterior wall, with the exterior wall being configured to contact an outboard surface of the vehicle body structure and the lateral wall being configured to extend into the wheel well when the vehicle splash guard is installed to the vehicle body structure; and
the mounting structure is defined on an inner surface of the lateral wall.

5. The vehicle splash guard according to claim 4, wherein the at least one non-fastener locating projection includes a first non-fastener locating projection that extends away from an inner surface of the lateral wall and vertically proximate to an inboard edge of the lateral wall, the first non-fastener locating projection being configured to contact the free standing inboard edge of the vehicle body structure to restrict movement of the exterior wall away from the vehicle body structure when the vehicle splash guard is installed to the vehicle body structure.

6. The vehicle splash guard according to claim 4, wherein the base portion further includes a bottom member that spans lower edges of the exterior wall and the lateral wall;
the laterally extending edge of the vehicle body structure is located on an underside of the vehicle body structure and is spaced apart from the lateral wall of the base portion; and
the at least one non-fastener locating projection includes a first non-fastener locating projection that extends away from an upper surface of the bottom member, the first non-fastener locating projection being configured to contact the laterally extending edge of the vehicle body structure to restrict movement of the lateral wall away from the vehicle body structure when the vehicle splash guard is installed to the vehicle body structure.

7. The vehicle splash guard according to claim 4, wherein the base portion further includes a bottom member that spans lower edges of the exterior wall and the lateral wall;
the free standing inboard edge of the vehicle body structure extends in the longitudinal direction, the free standing inboard edge being located on an underside of the vehicle body structure and spaced apart from the exterior wall of the base portion; and
the at least one non-fastener locating projection includes a first non-fastener locating projection that extends away from an upper surface of the bottom member, the first non-fastener locating projection being configured to contact the free standing inboard edge of the vehicle body structure to restrict movement of the exterior wall away from the vehicle body structure when the vehicle splash guard is installed to the vehicle body structure.

8. The vehicle splash guard according to claim 7, wherein the laterally extending edge of the vehicle body structure is located on the underside of the vehicle body structure and is spaced apart from the lateral wall of the base portion such that the laterally extending edge of the vehicle body structure cooperates with the free standing inboard edge of the vehicle body structure to define a corner; and
the first non-fastener locating projection is further configured to contact the corner to restrict both movement of the lateral wall away from the vehicle body structure and movement of the exterior wall away from the vehicle body structure when the vehicle splash guard is installed to the vehicle body structure.

9. The vehicle splash guard according to claim 8, wherein a vertically oriented surface of the first non-fastener locating projection includes an arcuate shape that conforms to a radial contour of the corner.

10. The vehicle splash guard according to claim 4, wherein the at least one non-fastener locating projection includes a first non-fastener locating projection that extends away from an inner surface of the lateral wall, the first non-fastener locating projection being configured to contact an underside of the vehicle body structure along an inboard distal end of the vehicle body structure to restrict movement of the exterior wall away from the vehicle body structure when the vehicle splash guard is installed to the vehicle body structure.

11. The vehicle splash guard according to claim 4, wherein the base portion further includes a bottom member that spans lower edges of the exterior wall and the lateral wall and that is spaced apart from an underside of the vehicle body structure; and
the at least one non-fastener locating projection includes a first non-fastener locating projection that extends away from an inner surface of the lateral wall and that is spaced apart from the bottom member of the base portion, with the first non-fastener locating projection being configured to contact an underside of the vehicle body structure along an inboard distal end of the vehicle body structure to restrict movement of the exterior wall away from the vehicle body structure when the vehicle splash guard is installed to the vehicle body structure.

12. The vehicle splash guard according to claim 5, wherein the base portion further includes a bottom member that spans lower edges of the exterior wall and the lateral wall;
the laterally extending edge of the vehicle body structure is located on an underside of the vehicle body structure and is spaced apart from the lateral wall of the base portion; and
the at least one non-fastener locating projection further includes a second non-fastener locating projection that extends away from an upper surface of the bottom member, with the second non-fastener locating projection being configured to contact the laterally extending edge of the vehicle body structure to restrict movement of the lateral wall away from the vehicle body structure when the vehicle splash guard is installed to the vehicle body structure.

13. The vehicle splash guard according to claim 12, wherein
the at least one non-fastener locating projection further includes a third non-fastener locating projection that extends away from the inner surface of the lateral wall, the third non-fastener locating projection being configured to contact the underside of the vehicle body structure along an inboard distal end of the vehicle body structure to restrict movement of the exterior wall away from the vehicle body structure when the vehicle splash guard is installed to the vehicle body structure.

14. The vehicle splash guard according to claim 4, wherein
the base portion further includes a bottom member that spans lower edges of the exterior wall and the lateral wall; and
the vehicle splash guard further comprises an additional mounting structure defined on an upper surface of the bottom member and configured to fixedly couple the vehicle splash guard to the vehicle body structure, with the additional mounting structure being spaced apart from a peripheral edge of the bottom member.

15. A vehicle splash guard comprising:
a base portion including an exterior wall, a lateral wall extending transversely from the exterior wall, and a bottom member that spans lower edges of the exterior wall and the lateral wall and that is spaced apart from an underside of the vehicle body structure, with the exterior wall being configured to contact an outboard surface of a vehicle body structure and the lateral wall being configured to extend into a wheel well defined by the vehicle body structure when the vehicle splash guard is installed to the vehicle body structure;
a mounting structure defined on an inner surface of the lateral wall and configured to fixedly couple the vehicle splash guard to the vehicle body structure;
a first non-fastener locating projection extending away from the inner surface of the lateral wall and being spaced apart from both the mounting structure and the bottom member of the base portion, the first non-fastener locating projection being configured to contact an underside of the vehicle body structure along an inboard distal end of the vehicle body structure to restrict movement of the exterior wall away from the vehicle body structure due to rotation of the lateral wall about the mounting structure when the vehicle splash guard is installed to the vehicle body structure; and
a second non-fastener locating projection that extends away from the inner surface of the lateral wall and vertically proximate to an inboard edge of the lateral wall, the second non-fastener locating projection being configured to contact a free standing inboard edge of the vehicle body structure to further restrict movement of the exterior wall away from the vehicle body structure when the vehicle splash guard is installed to the vehicle body structure.

16. A vehicle splash guard comprising:
a base portion including an exterior wall, a lateral wall extending transversely from the exterior wall, and a bottom member that spans lower edges of the exterior wall and the lateral wall and that is spaced apart from an underside of the vehicle body structure, with the exterior wall being configured to contact an outboard surface of a vehicle body structure and the lateral wall being configured to extend into a wheel well defined by the vehicle body structure when the vehicle splash guard is installed to the vehicle body structure;
a mounting structure defined on an inner surface of the lateral wall and configured to fixedly couple the vehicle splash guard to the vehicle body structure;
a first non-fastener locating projection extending away from the inner surface of the lateral wall and being spaced apart from both the mounting structure and the bottom member of the base portion, the first non-fastener locating projection being configured to contact an underside of the vehicle body structure along an inboard distal end of the vehicle body structure to restrict movement of the exterior wall away from the vehicle body structure due to rotation of the lateral wall about the mounting structure when the vehicle splashguard is installed to the vehicle body structure; and
a second non-fastener locating projection that extends away from an upper surface of the bottom member, the second non-fastener locating projection being configured to contact a free standing inboard edge of the vehicle body structure that extends in a longitudinal direction of the vehicle body structure, that is located on an underside of the vehicle body structure, and that is spaced apart from the exterior wall of the base portion to further restrict movement of the exterior wall away from the vehicle body structure when the vehicle splash guard is installed to the vehicle body structure.

* * * * *